United States Patent [19] | [11] 3,894,247
De Jong | [45] July 8, 1975

[54] CIRCUIT FOR INITALIZING LOGIC FOLLOWING POWER TURN ON

[75] Inventor: Robert De Jong, Placentia, Calif.

[73] Assignee: Rockwell International Corporation, El Segundo, Calif.

[22] Filed: Dec. 26, 1973

[21] Appl. No.: 428,481

[52] U.S. Cl. ................ 307/208; 307/215; 307/246; 307/247 A; 307/293; 307/297; 328/60; 328/196

[51] Int. Cl.$^2$. H03K 19/08; H03K 5/13; H03K 1/12

[58] Field of Search ....... 307/208, 215, 247 A, 246, 307/291, 293, 297; 328/55, 60, 195, 196

[56] References Cited

UNITED STATES PATENTS

| | | | |
|---|---|---|---|
| 3,132,260 | 5/1964 | Gunderson et al. | 307/293 |
| 3,134,030 | 5/1964 | Dao | 307/293 |
| 3,358,238 | 12/1967 | Shapiro et al. | 307/215 |
| 3,727,141 | 4/1973 | Finlay | 307/247 A |

*Primary Examiner*—Stanley D. Miller, Jr.
*Attorney, Agent, or Firm*—H. Fredrick Hamann; G. Donald Weber, Jr.; Robert Ochis

[57] ABSTRACT

A solid state delay circuit responsive to power turn-on for delaying the start-up and operation of a system until power has stabilized is disclosed. The delay circuit is particularly useful where the delay and program initialization system is used with or includes computers and computer operated equipment.

6 Claims, 2 Drawing Figures

CIRCUIT FOR INITALIZING LOGIC FOLLOWING POWER TURN ON

BACKGROUND OF THE INVENTION

1. Field of the Invention

The invention relates to the field of delay circuits responsive to power turn-on for delaying the start-up and operation of a system until the power has stabilized and for initiating further operations or delays as the system may require. In particular, the invention relates to such circuits for use with computer operated equipment.

2. Prior Art

The prior art is replete with systems for delaying the initialization and operation of a system until the system has stabilized after the application of power. Typical of such systems is the thermal delay relay type system. These thermal delay systems work effectively in controlling the application of power to electrical equipment. However, when such systems are transposed into computer systems to perform similar functions, any one or more of a plurality of problems may develop. First, the thermal relay may not make positive contact upon closing. This results in contact bounce or varying resistance in the energized circuit which cause a variety of faults including initialization of the system to improper states and improper computer program initialization. The improper program initialization can include sporadic and unreliable initialization which can cause program malfunction and/or information loss. Further, these problems can include sequential multiple initializations of the program which interfere with each other, cause destruction of data due to loss of power during data transfer, create halt conditions within the program which prevent proper program function until the program has been reset by an operator, and the like.

A further problem with thermal relay power initialization systems is that the delay between the turn on of power and the generation of signals controlled by the thermal relay depends upon the length of time power has been off. Thus, if power has been off a short time such that the thermal relay has not cooled significantly, the thermal relay will switch on rapidly and is ineffective for the primary purpose of preventing premature application of signals to the protected circuitry.

SUMMARY OF THE INVENTION

The present invention, for each application of power to the system, produces a single reliable delayed initialization signal with a delay which is independent of cycle time.

The desired delay time is achieved by charging a capacitor through a large resistor. A computer logic circuit, having an input terminal thereof connected to the capacitor, changes states when the voltage on the capacitor reaches the threshold voltage for the computer logic circuit. The change of state of the computer logic circuit switches a latch circuit, thus assuring that only one initialization signal is generated for each activation of the system. The output signal produced by the latch circuit is processed in accordance with the initialization requirement of the circuitry to be initialized.

DESCRIPTION OF THE PREFERRED EMBODIMENT

Figure 1:
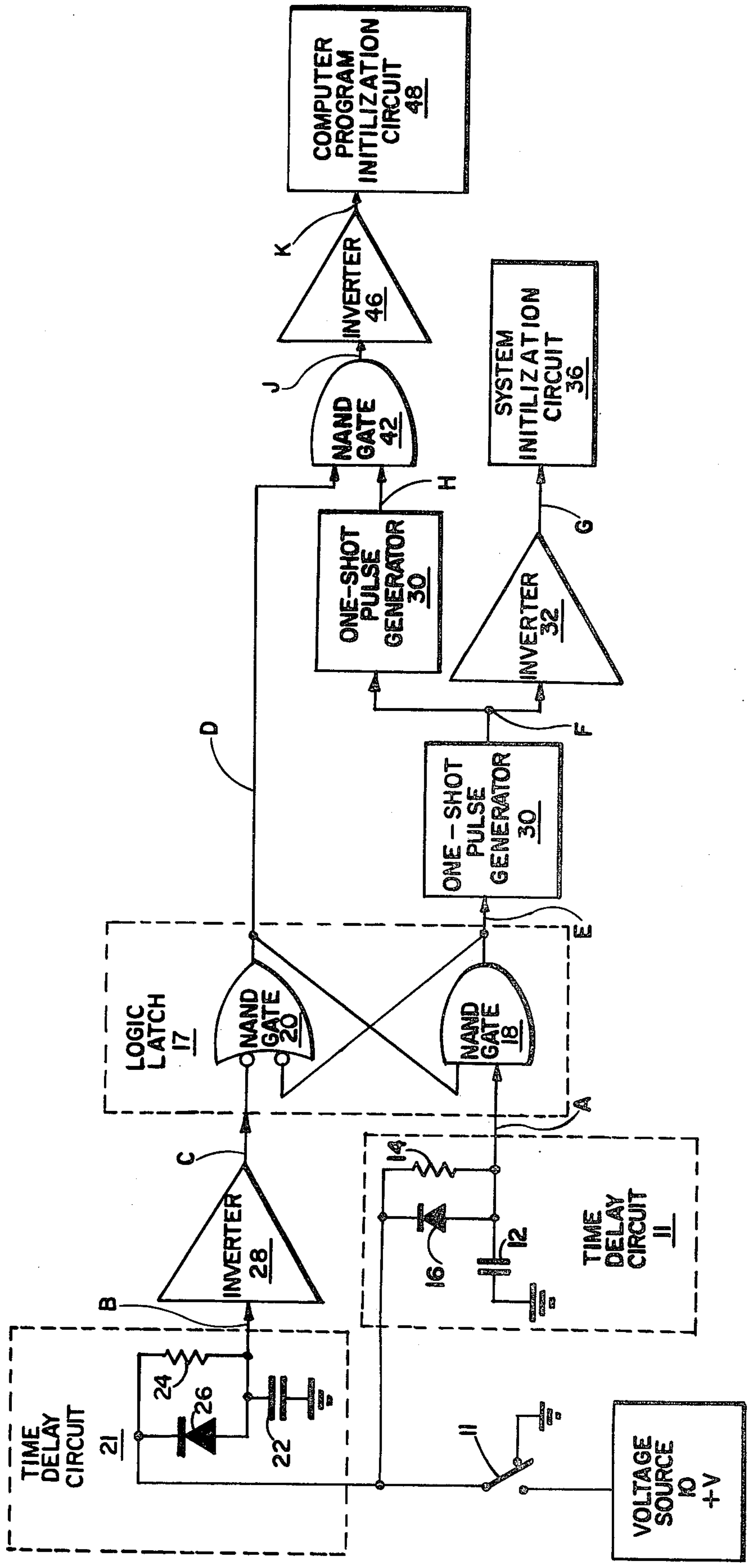
FIG. 1 is a partially schematic, partially block diagram of a power initialization circuit in accordance with the instant invention.

A preferred embodiment of a power initialization circuit in accordance with the instant invention is illustrated in FIG. 1. A capacitor 12 has a first plate thereof electrically connected to a reference voltage source such as ground and a second electrode thereof connected to a node A. A resistor 14 has a first terminal thereof electrically connected to node A and the second terminal thereof electrically connected to a voltage source 10 which, in the illustrated embodiment, provides a positive voltage +V. A diode 16 has the anode thereof connected to node A and the cathode thereof connected to voltage source 10. Capacitor 12, resistor 14 and diode 16 together comprise a time delay or charging circuit 11 which impresses the reference voltage (i.e., ground voltage) on node A when voltage source 10 is first energized. With positive logic, the low voltage (i.e., ground) corresponds to a logical zero, while a high voltage (i.e., +V) corresponds to a logical one. As capacitor 12 is charged by current flowing in resistor 14 or other current entering node A, the voltage on node A increases until it corresponds to a logical 1.

A second delay or charging network 21 similar to delay network 11 is also provided. Delay network 21 comprises a capacitor 22 having a first plate thereof connected to ground (i.e., the reference voltage) and a second electrode thereof connected to a node B. Resistor 24 has a first terminal thereof connected to node B and a second terminal thereof connected to voltage source 10. Diode 26 has the anode thereof connected to node B and the cathode thereof connected to voltage supply 10. Although delay networks 11 and 21 are composed of similar circuit components connected in a similar fashion, significantly different delay periods are established by making capacitor 22 much larger than capacitor 12. In the preferred embodiment, the capacitance of capacitor 22 is about 100 times as large as the capacitance of capacitor 12. In this way, capacitor 12 charges more rapidly than capacitor 22 thereby delay network 11 impresses a voltage corresponding to a logical one on node A well before delay network 21 impress a voltage corresponding to a logical one on node B.

An inverter 28 has the input terminal thereof connected to node B and the output terminal thereof connected to node C. The voltages at nodes A and C comprise the input signals to a two-input logical latch 17 comprised of two NAND gates 18 and 20, each of which have first and second inputs. Node A is connected to the first input and NAND gate 18 while node C is connected to the first input of NAND gate 20. The output terminal of NAND gate 18 is connected to a node E, and to the second input of NAND gate 20. The output terminal of NAND gate 20 is connected to a node D and to the second input of NAND gate 18.

A one-shot pulse generator 30 has the input terminal thereof connected to node E and the output terminal thereof connected to node F. A logical inverter 32 has the input terminal thereof connected to node F and the output terminal thereof logically connected to node G, the signal at which comprises the logical input to a system initialization or reset circuit the characteristics of which depend on the requirements of the circuitry to be reset. A second one-shot pulse generator 40 has the input terminal thereof connected to node F and the output terminal thereof connected to node H. A NAND gate 42 has a first input terminal thereof connected to node D and a second input terminal thereof connected to node H. The output terminal of NAND gate 42 is connected to node J to which the input terminal of a logical inverter 46 is connected. The output terminal of inverter 46 is connected to a node K to which the input terminal of a program initialization network 48 is connected. The characteristics of program initialization network 48 depend on the requirements of the program processor to be initialized.

OPERATION OF THE PREFERRED EMBODIMENT

Figure 2:
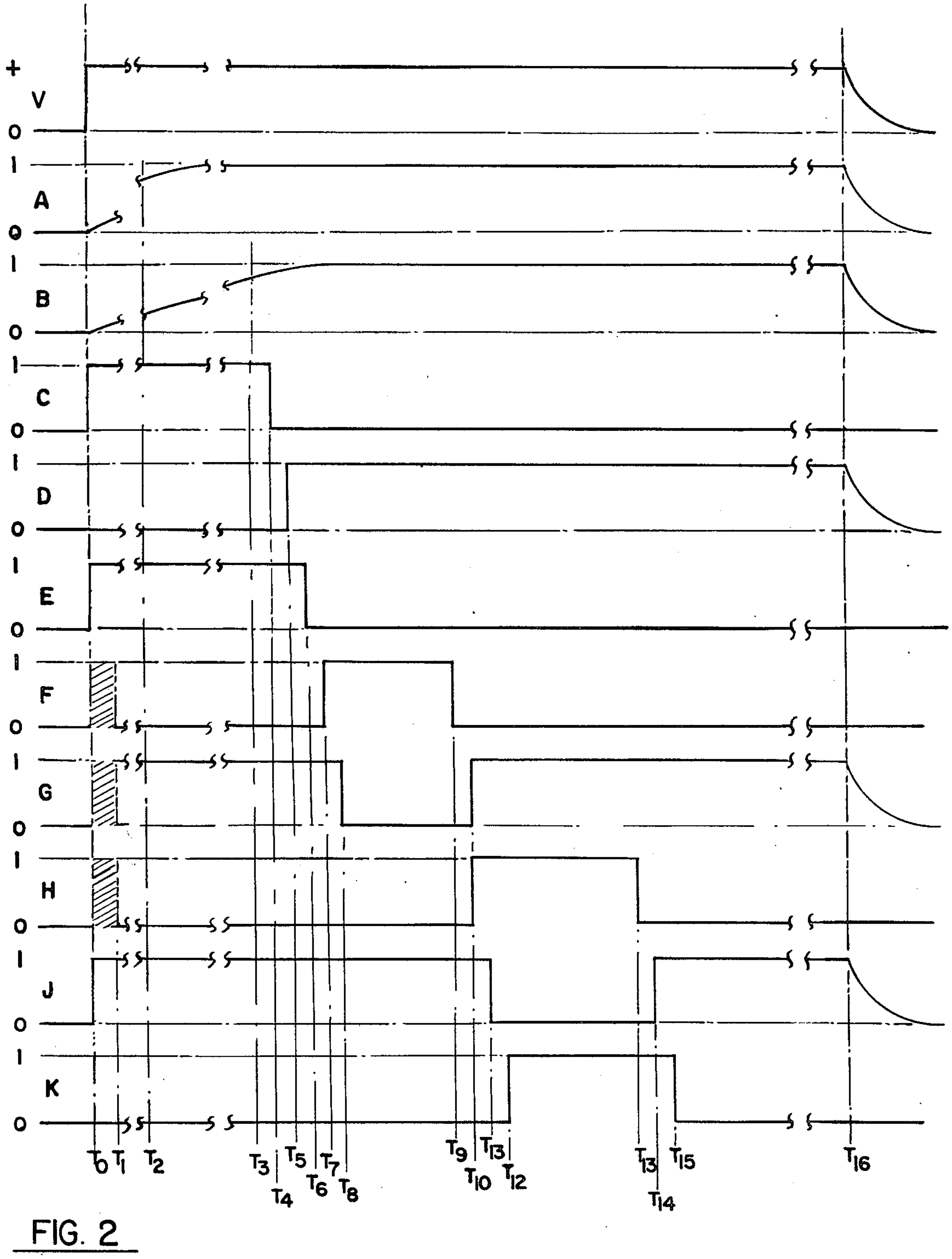
FIG. 2 is a graphic representation of voltage versus time for specified points of the circuit of FIG. 1.

In describing the operation of the preferred embodiment reference is concurrently made to FIGS. 1 and 2. FIG. 2 graphically shows voltage and signal levels at designated points in the circuit shown in FIG. 1.

When a computer or other system employing the present invention is to be energized, switch 11 is closed at time $T_0$. The voltage supplied to the system from voltage source 10 ultimately increases to design voltage +V and tends to stabilize there, as graphically illustrated in FIG. 2, line V. However, the voltage across capacitors 12 and 22 cannot change instantaneously. Therefore, even though power is applied to the overall system at time $T_0$ according to idealized waveform V, the voltage across capacitors 12 and 22 varies as shown in lines A and B.

As a result of the application of voltage from source 10, current is supplied to nodes A and B via resistors 14 and 24, respectively, thereby charging capacitors 12 and 22, respectively. Depending upon the circuit configuration thereof, NAND gate 18 may also supply current to node A to charge capacitor 12. Similarly, additional current may be supplied to node B from the input of logical inverter 28 to provide additional charge to capacitor 22.

The voltage waveform at node A is graphically illustrated in FIG. 2, line A, while the voltage waveform at node B is illustrated by the voltage waveform at line B. Initially, the voltages at nodes A and B are at about zero volts. These voltages are low enough that NAND gate 18 and inverter 28 will interpret the respective input signals as logical zeros. Inverter 28 produces a high voltage output signal corresponding to a logical one at node C. The voltage at node C. constitutes one input signal to NAND gate 20.

A NAND gate produces a logical one at the output terminal thereof unless all of the input signals supplied thereto are logical ones. Consequently, since at least one input signal supplied to NAND gate 18 is a logical zero at time $T_0$, NAND gate 18 produces a logical one signal at the output terminal thereof. This logical one is applied to node E and to a second input terminal of NAND gate 20. Since all of the input terminals of NAND gate 20 are presented with input voltages corresponding to logical ones, NAND gate 20 produces a low voltage corresponding to a logical zero at the output terminal thereof at node D. Since the output of NAND gate 20 is connected to a second input terminal of NAND gate 18, both inputs to NAND gate 18 are voltages corresponding to logical zeros. Any one of the low level input signals causes the output signal from NAND gate 18 to be a voltage corresponding to a logical one. Consequently, logic latch 17 produces a voltage corresponding to a logical zero at node D and a voltage corresponding to a logical one at node E until an externally applied input signal changes the status of the NAND gates.

Under the above conditions (a logical one at node E) neither oneshot pulse generator 30 nor one-shot pulse generator 40 will produce an output pulse. That is, the one-shot pulse generators will operate to produce an output pulse only in response to an input pulse or level transition. Thus one-shot pulse generator 40 is "triggered" by one-shot 30 and one-shot 30 is "triggered" by latch 17. Consequently, nodes F and H are provided with voltages corresponding to logical zeros. However, when power is first applied, either one-shot pulse generator 30 or 40 or both can come on with the output voltage thereof at a high value. If this occurs, the output voltage(s) will return to a low level when the output voltage of the generator has been high for the duration of a one-shot pulse. Consequently, the voltage levels or logic values at nodes F through H are somewhat indeterminate during a period of time after power is applied. The period of indeterminate voltage levels ends at least by time $T_1$ in the waveforms. During the period of indeterminate voltage levels at nodes F through H, node D is at zero volts (a logical zero). Since the voltage on node D is one of the input signals to NAND gate 42, the output signal of NAND gate 42 is forced to a high voltage corresponding to a logical one independent of the conditions at the other input of NAND gate 42 which is connected to node H. This prevents activation of computer program initialization circuit 48 before the expiration of the delay periods of delay circuits 11 and 21. Unlike program initialization circuit 48, system initialization circuit 36 may be activated during the period of indeterminate voltage levels. Such activation causes no problems because the system initialization circuit simply resets circuit states without initiating any continuing action. In an alternative embodiment, a NAND gate similar to NAND gate 42 could be inserted between one-shot pulse generator 30 and inverter 32 to prevent activation of circuit 36 until after the end of the delay periods of delay circuits 11 and 21.

If neither one-shot pulse generator comes on with a high output voltage, i.e., in the middle of an output pulse, or after the end of any initial period of high voltage outputs from one-shot pulse generators 30 and 40, the logical zero at node D and the logical one at node E prevent one-shot pulse generators 30 and 40 from producing any additional pulses until logic latch 17 switches states. Consequently, node F is provided with a voltage corresponding to a logical zero. Therefore, logic inverter 32 produces a high output voltage corresponding to a logical one at node G. This signal does not activate system initialization circuit 36.

Since logical zeros are impressed on nodes D and H which are connected to the first and second input terminals of NAND gate 42, respectively, the output of NAND gate 42 at node J is a logical one. With a voltage corresponding to a logical one for an input signal, logic inverter 46 produces a voltage corresponding to a logical zero at its output node K, and program initialization circuit 48 is inactive.

The above described initial conditions are schematically illustrated at time period $T_0$ of FIG. 2. As the voltage at node A continues to increase as a result of the charging of capacitor 12, the voltage eventually reaches a threshold level (for example at time period $T_2$) at which it is interpreted as a logical one by NAND gate 18. This change in the voltage on node A is preferably designed to occur at or after the end of the period of indeterminate voltages at nodes F and H, i.e., time period $T_1$. However, this signal change produces no change in the voltages at the other nodes. That is, although the input signal applied to NAND gate 18 at node A is now a voltage corresponding to a logical one, the input signal applied to NAND gate 18 (at node D) is still a logical zero. Therefore, the output of NAND gate 18 remains a logical one.

Subsequently, at time period $T_3$, the voltage at node B reaches the threshold voltage of logic inverter 28 and is interpreted as a logical one. Accordingly, logic inverter 28 produces a voltage corresponding to a logical zero at its node C. Consequently, at time period $T_4$, NAND gate 20 no longer has logical ones applied to all of its input terminals and, therefore, the output signal produced thereby changes from a voltage corresponding to a logical zero to a voltage corresponding to a logical one at time period $T_5$. Since the output signal of NAND gate 20 is supplied to the second input terminal of NAND gate 18, both input signals to NAND gate 18 are now voltages corresponding to logical ones. Consequently, the output signal of NAND gate 18 (at node E) switches from a voltage corresponding to a logical one to a voltage corresponding to a logical zero at time period $T_6$. Since the output signal from NAND gate 18 is provided to the second input terminal of NAND gate 20, NAND gate 20 now has logical zeros applied to all of its inputs. This assures that even if logic inverter 28 should change states such that node C once again became a logical one, there would be no change in the logical output from gate 20 unless the logical value at node A also changed to a logical zero. This will not happen unless power to the system is turned off. When the output of NAND gate 20 becomes a logical one, the first input to NAND gate 42 becomes a logical one. This change causes no change in the output of NAND gate 42, since the second input to NAND gate at node H is still a logical zero.

One-shot pulse generator 30 generates a pulse (see line F) in response to a negative transition of the input voltage supplied thereto. Such a negative transition occurs when the output signal of NAND gate 18 changes from a voltage corresponding to a logical one to a voltage corresponding to a logical zero at time period $T_6$ as shown at line E. One-shot pulse generator 30, therefore, produces a single pulse in response to the transition of the output of NAND gate 18 from a logical one to a logical zero. However, the leading edge of the pulse at node F is delayed until time period $T_7$ by the response time of one-shot pulse generator 30. The response time of all the circuits is exaggerated in FIG. 2 in order to make the order of events clear. Ideally, one-shot generator 30 responds instantaneously to the signal at node E. The pulse at node F is inverted and applied to node G by inverter 32 whereby the pulse activates system initialization circuitry 36 at time period $T_8$.

One-shot pulse generator 40 also receives the pulse of generator 30 at node F. However, since one-shot pulse generator 40 generates a pulse only on the negative transition of its input signal, no signal is generated by generator 40 until the pulse from gate 30 terminates and produces a negative going signal at time period $T_9$. Once the pulse from generator 30 terminates, one-shot pulse generator 40 produces one pulse which is delayed until time period $T_{10}$ by the response time of pulse generator 40. During the period that the output pulse of one-shot pulse generator 40 is positive, (i.e., time periods $T_{10} - T_{13}$) a positive signal is applied at a second input terminal of NAND gate 42. (Incidentally, the duration of the pulses at nodes F and H are dependent upon the circuit configurations of generators 30 and 40.) Inasmuch as the signal at the first input terminal of NAND gate 42 became a logical one at time period $T_5$ when the output signal of NAND gate 20 became a logical one, all of the input signals to NAND gate 42 are logical ones when the pulse from generator 40 is positive, i.e., time periods $T_{10} - T_{13}$. Consequently, NAND gate 42 forces the output signal at node J to a low voltage corresponding to a logical zero during the time periods $T_{11} - T_{14}$. As a result of this change, inverter 46 forces the output signal at node K to a voltage corresponding to a logical one during the time period $T_{12} - T_{16}$. Thus, the output pulse of one-shot pulse generator 40 is applied to the input of program initialization circuit 48 which is activated by the pulse.

A brief review of the voltage waveforms of the various nodes as illustrated in FIG. 2 will show that the system initialization circuit 36 is activated before program initialization circuit 48. The time delay between the activation of system initialization circuit 36 and program initialization circuit 48 is equal to the width of the pulse generated by one-shot pulse generator 30. This assures that the system is reset to interface properly with the computer prior to program initialization at which time the program takes automatic control of the system.

The characteristics of this power initialization circuit make it particularly useful in a system where automatic system control is required after power up either by computers or other control devices. Also to initiate circuitry where further delays may be required: i.e., CRT, disk memory systems, and the like.

The delay period prior to system initialization and program initialization is controlled by the time required for the voltage at node B (the voltage on capacitor 22) to reach the threshold level of inverter 28. This delay time can be controlled by the size of capacitor 22 and the magnitude of the net current entering node B.

When power to the system is turned off, as at time period $T_{16}$ on, the voltage provided by voltage source 10 decays to zero volts. Diodes 16 and 26 in logic delay means 11 and 21, respectively, provide shunt paths which assure that the voltages on capacitors 12 and 22 decay as rapidly as the supply voltage. This assures that the power-up delay will be independent of the off-on cycle time of the system. Consequently, the present invention solves two severe problems of prior art power-up delay systems. Alternatively, switch 11 can be thrown to ground the cathodes of diodes 16 and 26 to provide substantially immediate discharge of capacitors 12 and 22, independent of decay time of the voltage output from source 10.

Thus, there has been shown and described a preferred embodiment of the instant invention. This embodiment is not intended to be limitative but is illustrative only. Those skilled in the art may be able to modify the embodiment described. For example, positive or negative logic and logic devices may be employed with equally useful results. Of course, certain signal levels will have to be modified. Moreover, slightly modified timing relationships may be implemented. Nevertheless, any modifications falling within the purview of the description are intended to be included within the scope of this invention which is limited only by the claims appended hereto.

What is claimed is:

1. A power initialization circuit comprising in combination:

first and second charging circuit means each having an input terminal and an output terminal, said first and second charging circuit means producing first and second time delays, respectively, following the application of a predetermined voltage to the input terminals of said charging circuit means;

first inverter means having an input terminal and an output terminal, said input terminal of said inverter means connected to said output terminal of said second charging circuit means for inverting the logical value of the signal produced by said second charging circuit means;

latch means having first and second input terminals and at least a first output terminal, said first input terminal connected to the output terminal of said first charging circuit means and the second input terminal of said latch means connected to said output terminal of said first inverter means for providing an output signal at the end of the longer of the first and second time delay periods.

2. The combination recited in claim 1 including source means for selectively supplying a signal to both said first and second charging circuit means;

each of said first and second charging circuit means including an RC circuit and a fast discharge shunt path.

3. The combination recited in claim 1 wherein the delay period of said second time delay means is at least 10 times longer than the delay period of said first time delay means to assure that the input signal at the first input terminal of said latch means changes before the input signal at the second input terminal of said latch means changes.

4. A power initialization circuit comprising, in combination:

first and second time delay means for producing first and second time delays, respectively;

latch means having first and second input terminals and first and second output terminals, said first input terminal connected to the first time delay means, said second input terminal connected to said second time delay means, for providing an output signal at the end of the longer of the two time delay periods;

first one shot pulse generating means having an input terminal and an output terminal, said input terminal of said first one shot pulse generating means connected to said first output terminal of said latch means for generating one pulse in response to a predetermined change in the output signal of said first output terminal of said latch means;

system initialization means having an input terminal connected to the output terminal of said first one shot pulse generating means, said system initialization circuit means controlling the application of a reset signal to a circuit the resetting of which is delayed from the initial application of power to the system in accordance with the input signal supplied to said system initialization means;

second one shot pulse generating means having an input terminal and an output terminal, said input terminal of said second one shot pulse generating means connected to the output terminal of said first one shot pulse generating means for producing one pulse at the output of said second one shot pulse generating means in response to a predetermined change in the output signal of said first one shot pulse generating means;

gate means having first and second input terminals and an output terminal, said first input terminal of said gate means connected to the second output terminal of said latch means and said second input terminal of said gate means connected to the output terminal of said second one shot pulse generating means, said gate means producing a first signal at the output terminal thereof in response to the application of prescribed signals to said first and second input terminals of said gate means; and program initialization means having an input terminal connected to the output terminal of said gate means for initializing a program when said first signal is produced at said output terminal of said gate means.

5. The combination recited in claim 4 further comprising:

inverter means connected in series between said gate means and said program initialization means, said inverter means having an input terminal and an output terminal, said input terminal of said inverter means connected to the output terminal of said gate means and the output terminal of said inverter means connected to the input terminal of said program initialization means.

6. A power initialization circuit comprising, in combination:

first and second time delay means for producing first and second time delays, respectively;

latch means having first and second input terminals and at least a first output terminal, said first input terminal connected to the first time delay means, said second input terminal connected to said second time delay means, for providing an output signal at the end of the longer of the two time delay periods;

first one shot pulse generating means having an input terminal and an output terminal, said input terminal of said first one shot pulse generating means connected to said first output terminal of said latch means for generating one pulse in response to a predetermined change in the output signal of said first output terminal of said latch means;

system initialization means having an input terminal connected to the output terminal of said first one shot pulse generating means, said system initialization circuit means controlling the application of a reset signal to a circuit the resetting of which is delayed from the initial application of power to the system in accordance with the input signal supplied to said system initialization means;

first inverter means connected in series between said second time delay means and said second input terminal of said latch means, said first inverter means have an input terminal and an output terminal, said input terminal of said inverter means connected to said second time delay means for inverting the logical value of the signal produced by said second time delay means, and said output terminal of said first inverter means connected to the second input terminal of said latch means;

second inverter means connected in series between said first one shot pulse generating means and said system initialization means, said second inverter means having an input terminal and an output terminal, said input terminal of said second inverter means connected to the output terminal of said first one shot pulse generating means and the output terminal of said second inverter means connected to the input terminal of said system initialization means.

* * * * *